United States Patent
Garcia Stopier et al.

(10) Patent No.: US 11,254,282 B2
(45) Date of Patent: Feb. 22, 2022

(54) CINCH LOCKING TONGUE FOR A VEHICLE OCCUPANT RESTRAINT SYSTEM

(71) Applicant: Joyson Safety Systems Acquisition LLC, Auburn Hills, MI (US)

(72) Inventors: Raymundo Garcia Stopier, Nuevo Leon (MX); Carlos Alberto Barrera Morales, Nuevo Leon (MX)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 160 days.

(21) Appl. No.: 16/241,957

(22) Filed: Jan. 7, 2019

(65) Prior Publication Data

US 2020/0216014 A1    Jul. 9, 2020

(51) Int. Cl.
*B60R 22/185*    (2006.01)
*A44B 11/25*    (2006.01)
*B60R 22/18*    (2006.01)

(52) U.S. Cl.
CPC ...... *B60R 22/1855* (2013.01); *A44B 11/2553* (2013.01); *A44B 11/2561* (2013.01);
(Continued)

(58) Field of Classification Search
CPC ............. B60R 22/1855; B60R 22/185; B60R 2022/1806; B60R 2022/1812; A44B 11/2561; A44B 11/2553
See application file for complete search history.

(56) References Cited

U.S. PATENT DOCUMENTS

| | | | | |
|---|---|---|---|---|
| 3,957,283 A | * | 5/1976 | Pocobello | ............... B60R 22/30 |
| | | | | 297/475 |
| 4,093,275 A | * | 6/1978 | Wize | ................... A44B 11/2538 |
| | | | | 24/598.5 |

(Continued)

FOREIGN PATENT DOCUMENTS

| | | |
|---|---|---|
| CN | 104309568 A | 1/2015 |
| CN | 104401288 A | 3/2015 |

(Continued)

OTHER PUBLICATIONS

International Search Report and Written Opinion dated Apr. 28, 2020 issued in related International PCT Application No. PCT/US2020/012374; filed Jan. 6, 2020.

*Primary Examiner* — Frank B Vanaman
(74) *Attorney, Agent, or Firm* — Gordon Rees Scully; Mansukhani, LLP

(57) ABSTRACT

A tongue mechanism for use in an occupant restraint system also having a buckle mechanism and a webbing. The tongue mechanism includes a tongue member configured to selectively engage the buckle mechanism, a body formed over a portion of the tongue member, a slider, and a biasing member configured to laterally bias the slider. The body includes a body contact surface. The slider includes a slider contact surface and is configured to travel along a track between a first free position and a second locking position. When the slider is positioned in the first free position the tongue mechanism is free to slide along the length of the webbing, and when the slider is positioned in the second locking position a portion of the webbing is clamped between the slider contact surface and the body contact surface thereby preventing the tongue mechanism from sliding along the length of the webbing.

23 Claims, 10 Drawing Sheets

(52) U.S. Cl.
CPC .............. *B60R 2022/1806* (2013.01); *B60R 2022/1812* (2013.01)

(56) References Cited

U.S. PATENT DOCUMENTS

| | | | |
|---|---|---|---|
| 4,129,320 A * | 12/1978 | Fancy | A44B 11/2538 24/599.7 |
| 4,685,740 A * | 8/1987 | Fohl | A44B 11/2557 297/216.11 |
| 5,411,292 A | 5/1995 | Collins et al. | |
| 5,870,816 A | 2/1999 | McFalls et al. | |
| 6,405,412 B1 | 6/2002 | Bell | |
| 7,325,280 B2 | 2/2008 | Ichida | |
| 7,871,132 B2 | 1/2011 | Rogers | |
| 8,052,220 B2 | 11/2011 | Dennis et al. | |
| 8,079,616 B2 | 12/2011 | Higuchi et al. | |
| 8,820,788 B2 | 9/2014 | Goudeau et al. | |
| 9,022,483 B2 | 5/2015 | Merrick | |
| 9,821,757 B2 | 11/2017 | Moeker et al. | |
| 9,821,759 B2 | 11/2017 | Farooq et al. | |
| 2012/0286501 A1 | 11/2012 | Goudeau et al. | |
| 2012/0291239 A1* | 11/2012 | Yamaguchi | A44B 11/2561 24/593.1 |
| 2013/0341994 A1 | 12/2013 | Boughner et al. | |
| 2016/0000190 A1 | 1/2016 | Knoedl | |
| 2016/0206050 A1 | 7/2016 | Aoyagi | |
| 2017/0055643 A1* | 3/2017 | Knoedl | A44B 11/2557 |
| 2017/0297528 A1 | 10/2017 | Hermann et al. | |
| 2017/0355349 A1 | 12/2017 | Betz et al. | |
| 2018/0220749 A1* | 8/2018 | Kato | A44B 11/2553 |
| 2019/0061680 A1* | 2/2019 | Wang | B60R 22/34 |
| 2020/0022462 A1* | 1/2020 | Lee | A44B 11/2557 |

FOREIGN PATENT DOCUMENTS

| | | |
|---|---|---|
| CN | 104401289 A | 3/2015 |
| CN | 104442682 A | 3/2015 |
| CN | 108791170 A | 11/2018 |
| CZ | 2007-0886 A3 | 7/2009 |
| DE | 103 39 810 A1 | 3/2004 |
| DE | 103 29 168 B4 | 6/2005 |
| DE | 10 2004 023 394 A1 | 12/2005 |
| DE | 10 2004 061 252 A1 | 6/2006 |
| DE | 10 2008 047 822 A1 | 3/2010 |
| EP | 2 072 350 A1 | 6/2009 |
| EP | 2 208 647 A1 | 7/2010 |
| FR | 2 950 301 A1 | 3/2011 |
| FR | 2 940 944 B1 | 5/2011 |
| JP | 2013-049334 A | 3/2013 |
| KR | 20120088976 A | 8/2012 |
| KR | 10-1235098 B1 | 2/2013 |
| KR | 10-1788193 B1 | 10/2017 |
| WO | WO 2006/092206 A1 | 9/2006 |
| WO | WO 2015/140341 A1 | 9/2015 |
| WO | WO 2017/174650 A1 | 10/2017 |

* cited by examiner

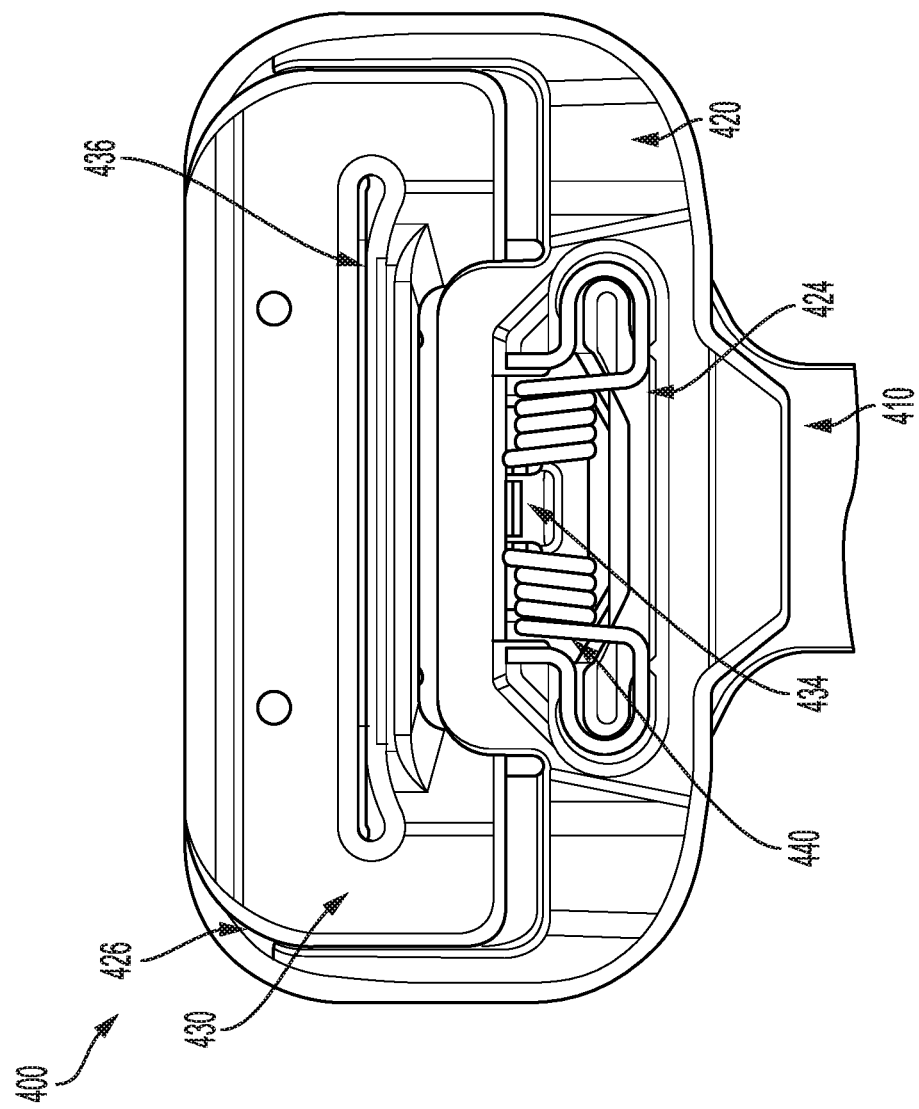

CINCH LOCKING TONGUE FOR A VEHICLE OCCUPANT RESTRAINT SYSTEM

BACKGROUND

The present disclosure generally relates to occupant restraint systems for vehicles to provide restraint to vehicle occupants.

The present disclosure relates to an occupant restraint system with a tongue mechanism that includes a slider and is configured to provide selective clamping to a seatbelt webbing.

Motor vehicles are equipped with occupant restraint systems such that in the event a motor vehicle experiences a dynamic impact event, the occupants of the motor vehicle are restrained and protected from inertial impacts. The most common occupant restraint systems use a three-point seatbelt system comprising a webbing fixed to a first anchored end and a second D-ring/retractor end, with a tongue mechanism and buckle mechanism providing the third connection point between the system and the motor vehicle.

In order to facilitate general ingress and egress while accommodating occupants of various shapes and sizes, the tongue mechanism is configured to selectively engage the buckle mechanism as a point of contact with the motor vehicle while sliding along the webbing of the three-point seatbelt system. Allowing the tongue mechanism to slide along the webbing provides maximum comfort to the occupant while allowing the retractor mechanism at the second end of the three-point seatbelt system to maintain tension evenly across all three anchor points.

During a dynamic impact event, the tongue mechanism clamps on the webbing of the three-point seatbelt system to arrest movement along the webbing and restrain the occupant. Designing the tongue mechanism to selectively clamp the webbing provides convenience when the occupant is seated in the normal course of vehicular activity and security when the occupant experiences a dynamic impact event.

There are a variety of designs for tongue mechanisms for occupant restraint systems, with a number of methods for selective engagement of the webbing. It is desirable to produce a tongue mechanism with a slim profile and a reinforced structure while maximizing its responsiveness during a dynamic impact event.

SUMMARY

Disclosed herein is a seat belt system for a vehicle. The seat belt system includes a tongue mechanism that includes a slider and is configured to provide selective clamping to a seatbelt webbing.

In another disclosed embodiment, an occupant restraint system of a vehicle includes a tongue mechanism, a buckle mechanism and a webbing. The tongue mechanism may have an opening through which the webbing passes and may be configured to selectively engage the buckle mechanism of the occupant restraint system. A body may be formed over a portion of the tongue member wherein the body includes a body contact surface, a first wall, and a second wall opposing the first wall. In one embodiment, the tongue mechanism includes a slider provided between the first and second walls of the body, wherein the slider is configured to slide laterally along a track between a first free position and a second locking position. The slider may include a slider contact surface. The tongue mechanism may include a biasing member configured to laterally bias the slider, wherein when the slider is positioned in the first free position the tongue mechanism is free to slide along the length of the webbing of the occupant restraint system, and when the slider is positioned in the second locking position a portion of the webbing is clamped between the slider contact surface and the body contact surface thereby preventing the tongue mechanism from sliding along the length of the webbing.

In another embodiment, the biasing member may be configured to laterally bias the slider towards the first free position. The biasing member may be configured to laterally bias the slider towards the first free position unless the slider exerts a force on the biasing member that exceeds a predetermined threshold. In still another embodiment, the predetermined threshold is determined by a frictional force between the webbing and the slider contact surface resulting from the relative movement between the webbing and the tongue mechanism and the webbing sliding relative to the slider contact surface so that the predetermined threshold corresponds to sliding of the webbing at a predetermined speed threshold.

In one embodiment, the body includes one or more stops configured to limit the lateral travel of the slider.

In one embodiment, the body includes an opening configured to receive at least a portion of the biasing member. In another embodiment, the slider includes an opening configured to receive at least a portion of the biasing member. The slide may be formed of two materials. For example, an outer material and an inner reinforcement material.

In one embodiment, when a portion of the webbing is clamped between the slider contact surface and the body contact surface, the motion of a portion of the webbing is restricted. The restriction portion may primarily be another portion of the webbing that is acting as the lap restraint for an occupant of the vehicle. The portion of webbing that is acting as the lap restraint for the seated occupant is the portion between the first end of the webbing connected to an anchor and the portion of the webbing that is in contact with the tongue mechanism.

The slider contact surface may be a concave surface designed to complement the shape of the body contact surface. In another embodiment, the body contact surface is a concave surface designed to complement the shape of the slider contact surface.

In one embodiment, the second end of the webbing is retractably connected to a retractor mechanism configured to pretension the webbing.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein:

FIG. 9 is a bottom view of the tongue mechanism of FIG. 8.

DETAILED DESCRIPTION

One aspect of the disclosure is directed to an occupant restraint system with a tongue mechanism that includes a slider and is configured to provide selective clamping to the seatbelt webbing.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
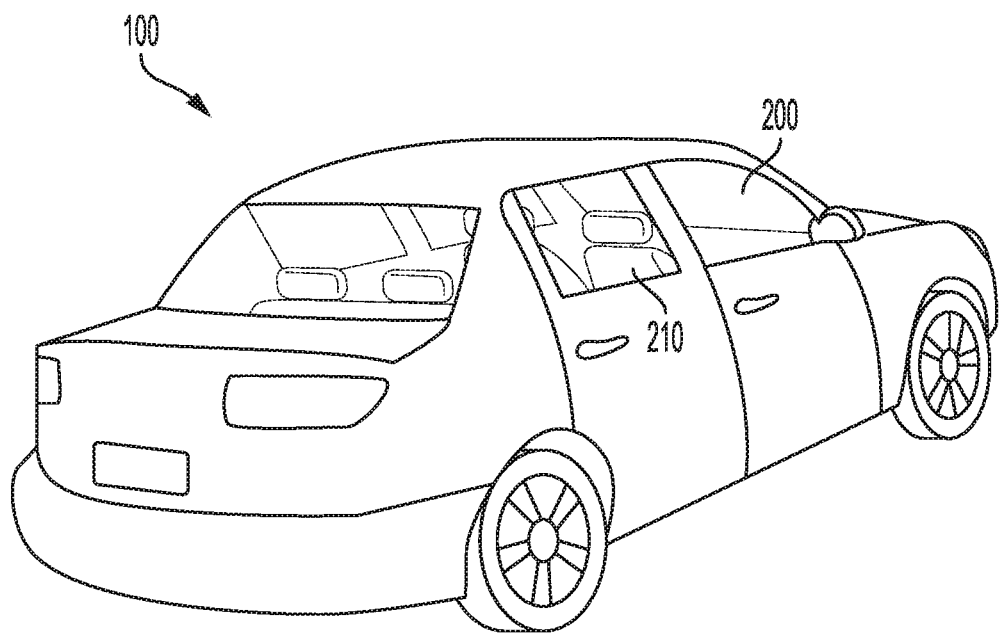
FIG. 1 is a perspective view of an exemplary embodiment of a motor vehicle.

FIG. 1 is a perspective view of an exemplary embodiment of a motor vehicle 100. The motor vehicle 100 includes a seat 210 with an occupant restraint system 200. The motor vehicle 100 is depicted as a mid-size sedan, but the occupant restraint system described may be used with any passenger vehicle or other vehicles that make use of occupant restraint systems.

Figure 2:
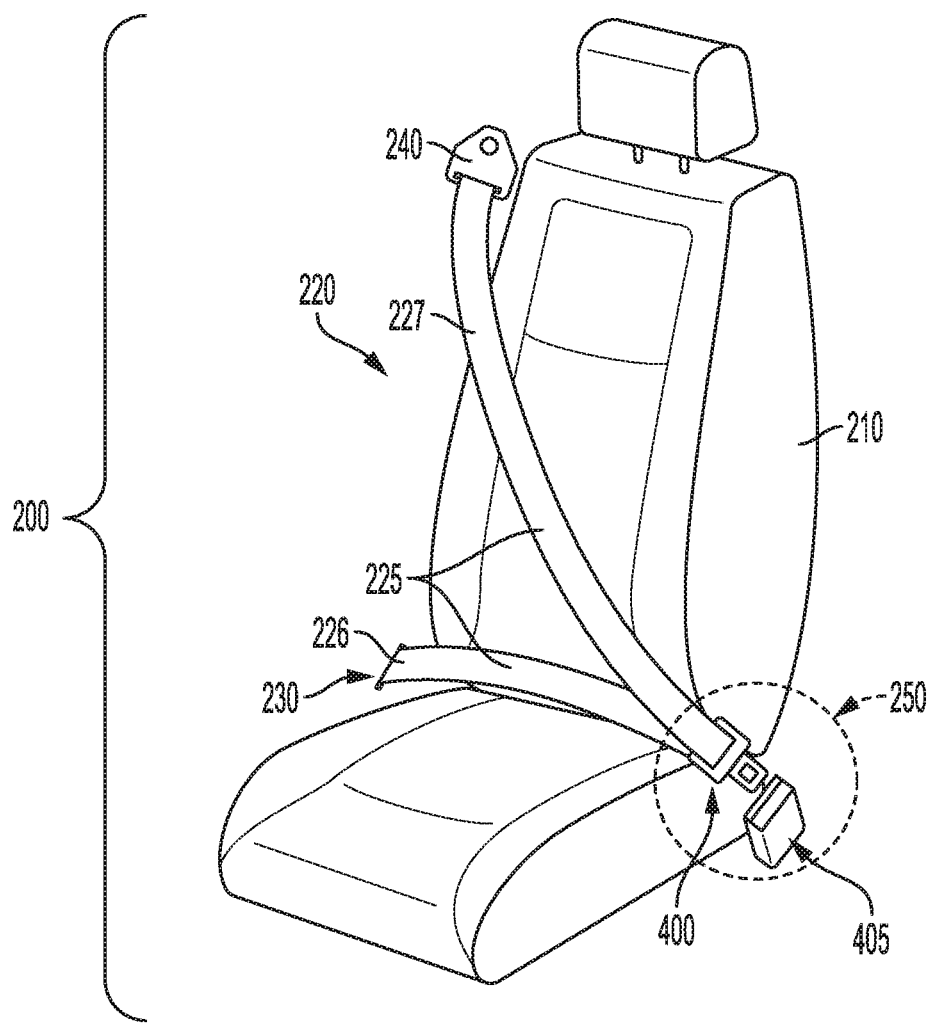
FIG. 2 is a perspective view of an exemplary embodiment of an occupant restraint system and seat for an occupant of a motor vehicle, such as the motor vehicle of FIG. 1.

FIG. 2 is a perspective view of an exemplary embodiment of an occupant restraint system 200 and seat 210 for an occupant of a motor vehicle, such as the motor vehicle 100. According to one embodiment, the occupant restraint system 200 includes a three-point seatbelt system 220 with an anchor 230, D-ring 240, and a buckle system 250 making up the three points of the system. The buckle system 250 includes a tongue mechanism 400 and a buckle mechanism 405. According to one embodiment, the tongue mechanism 400 and the buckle mechanism 405 are configured to selectively engage with each other to act as a single anchor point of the three-point seatbelt system 220.

In one embodiment, the three-point seatbelt system 220 includes webbing 225. The anchor 230 may serve as the first point of contact between the webbing 225 and the seat 210. The D-ring 240 may serve as the second point of contact between the webbing 225 and the seat 210. According to one embodiment, the webbing is connected to a retractor (not shown) after passing through the D-ring 240. According to one embodiment, the retractor is configured to reduce the slack of the webbing 225 such that an occupant of the seat 210 is properly secured without the webbing 225 being too loose or too tight. According to one embodiment, the tongue mechanism 400 divides the webbing 225 between a lap section 226 and a shoulder section 227. The section of webbing between the tongue mechanism 400 and the anchor 230 may be considered the lap section 226, while the section of webbing between the tongue mechanism 400 and the D-ring 240 may be considered the shoulder section 227. In one embodiment, the lap section 226 covers the lap of the occupant of the motor vehicle 100 and the shoulder section 227 covers the chest and shoulder of the occupant of the motor vehicle 100.

In one embodiment, the buckle system 250 acts as a selectively engaged third point of contact between the webbing 225 and the seat 210 and includes the tongue mechanism 400 and the buckle mechanism 405. The tongue mechanism 400 of the buckle system 250 may slide along the length of the webbing 225. According to one embodiment, the tongue mechanism 400 may selectively clamp on the webbing 225 to arrest its movement along the webbing 225. The buckle mechanism 405 of the buckle system 250 may be coupled to the seat 210 and selectively engaged with the tongue mechanism 400. According to one embodiment, a passenger of the motor vehicle 100 may engage or disengage the tongue mechanism 400 and buckle mechanism 405.

Figure 3:
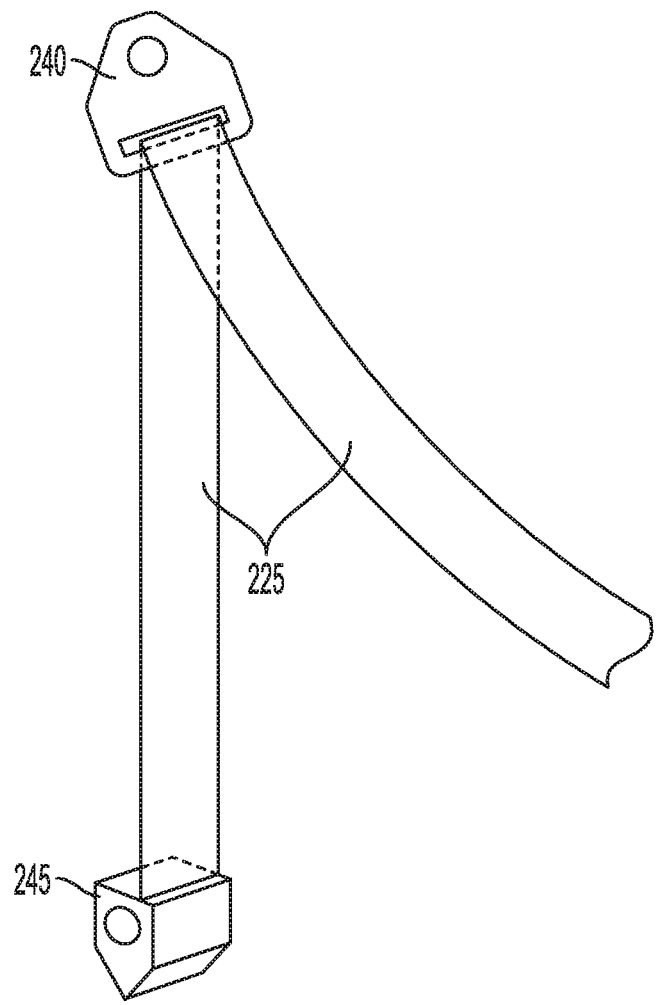
FIG. 3 is a perspective view of an exemplary embodiment of a retractor mechanism for use with an occupant restraint system.

FIG. 3 is a side view of an exemplary embodiment of a retractor mechanism 245 for use with an occupant restraint system 200. According to one embodiment, the webbing 225 is connected to a retractor mechanism 245 and then passes through the D-ring 240 that serves as the second point of contact with the motor vehicle 100. The retractor mechanism 245 may maintain tension on the webbing 225 throughout the occupant restraint system 200. It should be noted that this retractor mechanism 245 is only an exemplary embodiment of one of several types of retractor mechanisms that may be used to maintain tension on the webbing 225.

Figure 4:
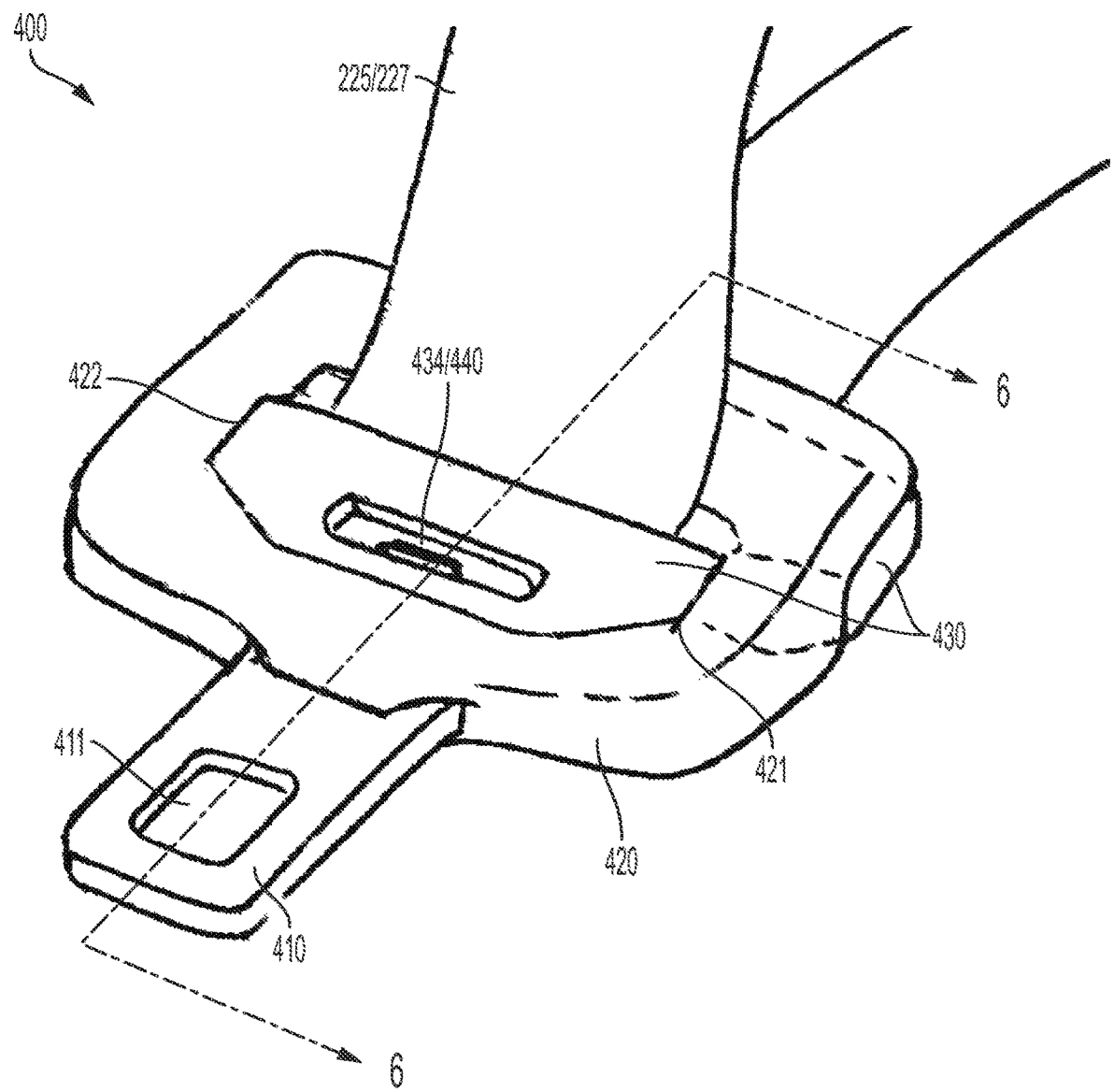
FIG. 4 is a perspective view of an exemplary embodiment of a tongue mechanism for use with an occupant restraint system.
Figure 5:
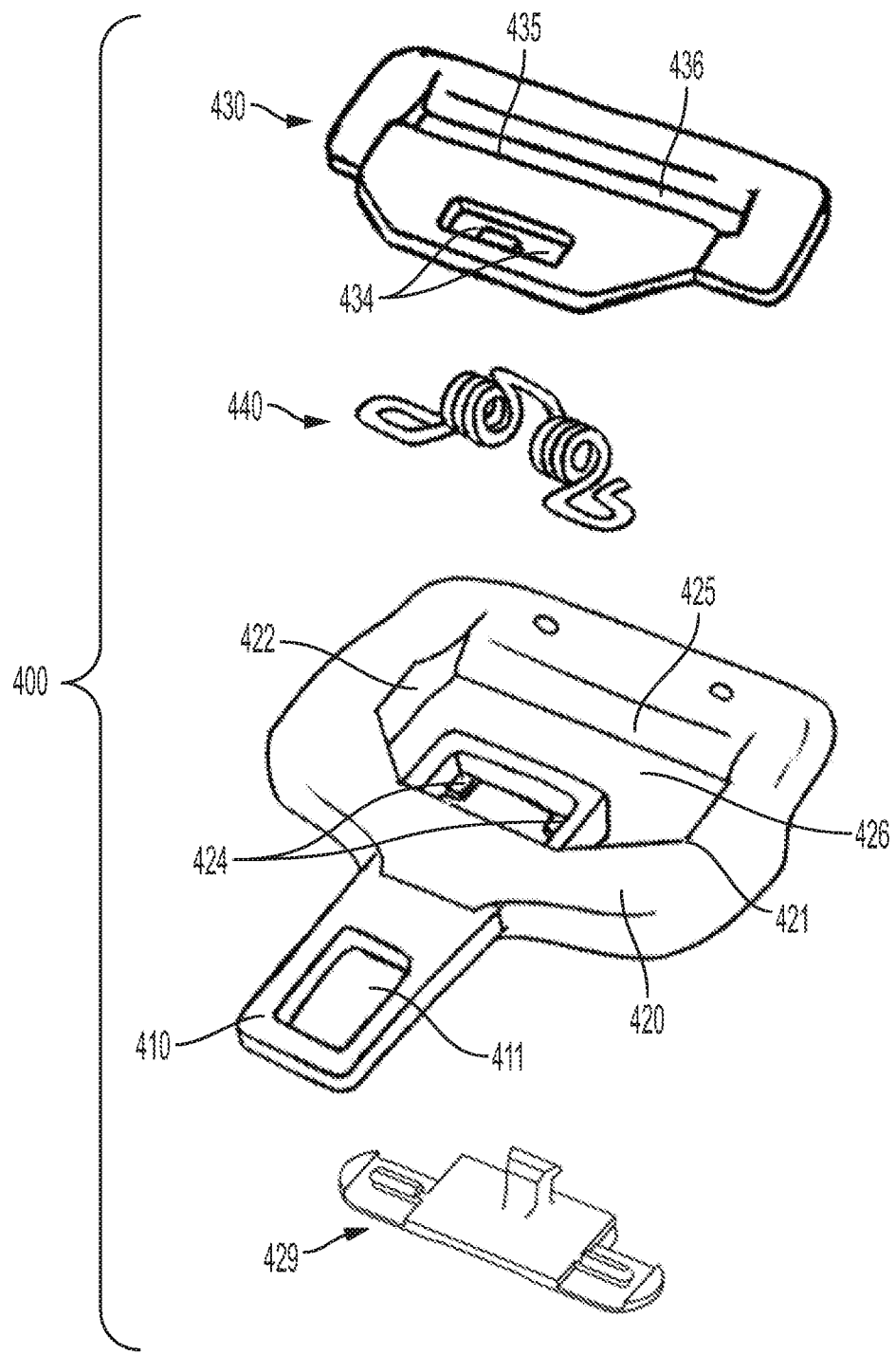
FIG. 5 is an exploded view of an exemplary embodiment of a tongue mechanism for use with an occupant restraint system.

FIG. 4 is a perspective view of an exemplary embodiment of a tongue mechanism 400 for use with an occupant restraint system 200. FIG. 5 is an exploded view of the same tongue mechanism 400. In one embodiment, the tongue mechanism 400 includes a tongue plate 410 with a tongue opening 411, a body 420, a slider 430, and a biasing member 440. In one embodiment, the tongue plate 410 is made of steel and is configured to selectively engage with the buckle mechanism 405 described in FIG. 2 by means of the tongue opening 411.

In one embodiment, the body 420 has a first wall 421 and a second wall 422 in opposition to the first wall 421 that together form a track that acts as a guide to restrain the movement of a slider 430. In one embodiment, the body 420 has a body contact surface 425 and a body gap 426 that acts as an opening for the slider 430. The first wall 421 and the second wall 422 may extend to form the walls of the body gap 426. The body gap 426 may be shaped such that its walls act as one or more stops configured to limit the lateral travel of the slider. In one embodiment, the tongue plate 410 includes a tongue plate gap that corresponds to the body gap 426 and a portion of the body 420 overlies the portion of the tongue plate 410 surrounding the tongue plate gap without obstructing the tongue plate gap. The body 420 may be constructed such that the body gap 426 coincides with and contains the tongue plate gap.

In one embodiment, the tongue mechanism 400 has two potential states: a first free state and a second locked state. The slider 430 may be used to switch the tongue mechanism 400 between these two states by switching between a first free position and a second locked position. The slider 430 may include a slider contact surface 435 and a slider gap 436 to allow the webbing 225 described in FIG. 2 to pass through. According to one embodiment, there is a gap between the body contact surface 425 and the slider contact surface 435 while the slider 430 is in the first free position. According to another embodiment, the webbing 225 may pass through this gap without restriction while the slider 430 is in the first free position.

In one embodiment, the biasing member 440 biases the slider 430 towards the first free position. In one embodiment, the biasing member 440 is a torsion spring. In one embodiment, the biasing member 440 is a double torsion spring. In one embodiment, the biasing member 440 is configured with one section fixed to a body socket 424 and another section fixed to a slider socket 434. In one embodiment, the biasing member 440 imparts force on the slider 430 at the location of the slider socket 434. A cap 429 may secure the biasing member 440 in its position in the body socket 424 and protect the biasing member 440 from corrosion or user interference.

According to another embodiment, the slider 430 remains in the first free position until enough force is placed on the slider 430 via the webbing 225 to overcome the bias of the biasing member 440 and translate the slider 430 laterally along the track formed by the first wall 421 and the second wall 422 to the second locked position. The slider 430 may travel a defined distance between the first free position and the second locked position. In one embodiment, the defined distance may be 1.5 millimeters.

While in the second locked position, the tongue mechanism 400 may clamp the webbing 225 between the body contact surface 425 and the slider contact surface 435, holding the tongue mechanism 400 in place relative to the webbing 225. According to one or more embodiments, while the tongue mechanism 400 clamps the webbing 225 between the two contact surfaces 425 and 435, the tongue mechanism 400 may no longer move freely with respect to the webbing 225.

In one embodiment, the slider contact surface 435 is a flat surface designed to complement the shape of the body contact surface 425. In another embodiment, the body contact surface 425 is a flat surface designed to complement the shape of the slider contact surface 435. The slider contact surface 435 may be configured to provide an increased surface area in contact with the webbing 225 to thereby increase the frictional force between the webbing 225 and the tongue mechanism 400. The increased frictional force may provide for smoother operation of the tongue mechanism 400, because the force imparted by the webbing is more efficiently transferred to the tongue mechanism 400 thereby more efficiently providing the force necessary to overcome the biasing member 440 and shift the slider 430 to the second locked position. In an alternative embodiment, the slider contact surface 435 and the body contact surface 425 may be formed as matching convex and concave surfaces.

In one embodiment, ignoring the protrusion of the tongue plate 410, the combined thickness of the body 420 and the slider 430 is 12.8 mm. In one embodiment, the width of the body 420 is 74.6 mm.

In one embodiment, when the complete tongue mechanism 400 is set on a surface, the height of the tongue mechanism from the point of contact with the surface up is 17 mm. In one embodiment, the length of the tongue mechanism 400 from the end of the tongue plate 410 to the end of the body 420 is 77.6 mm. In one embodiment, the mass of the tongue mechanism 400 is 94 grams.

Figure 6:
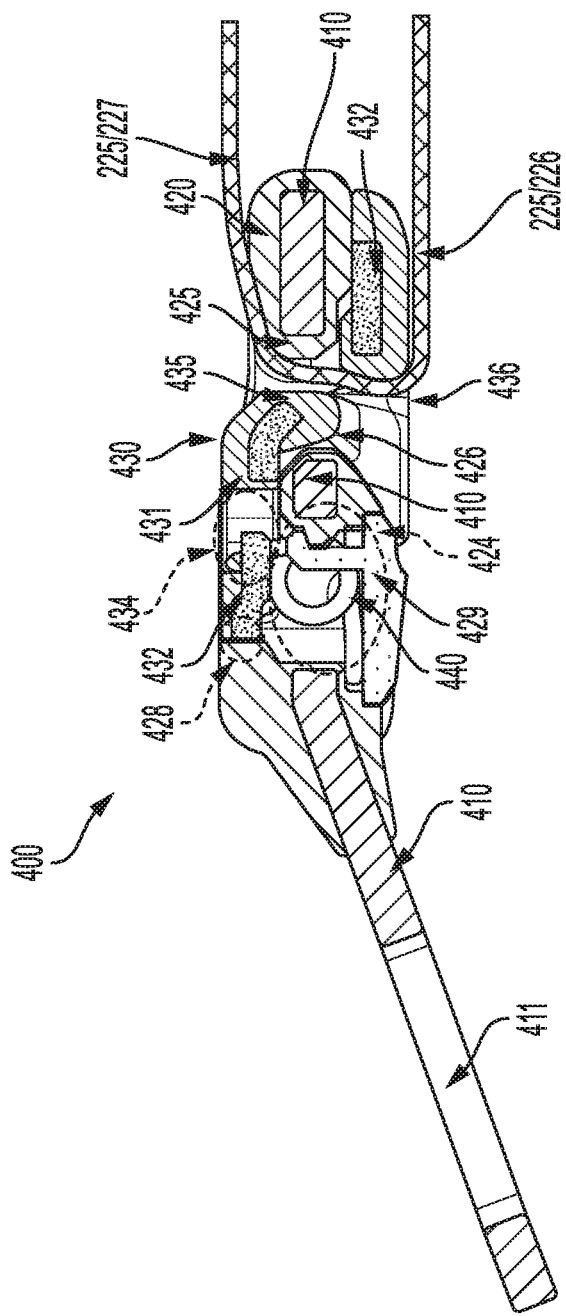
FIG. 6 is a partial sectioned side view of the tongue mechanism of FIG. 4 taken along the line 6-6, shown in a first free position.
Figure 7:
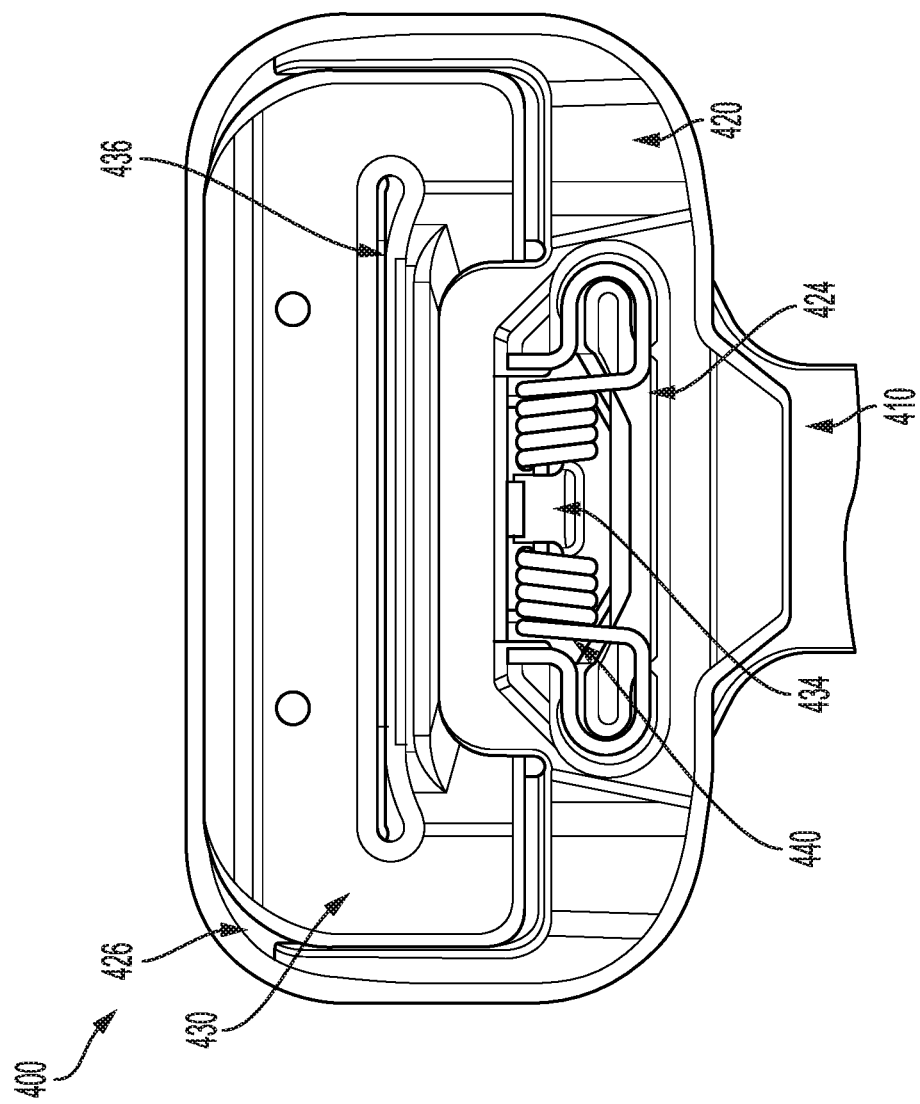
FIG. 7 is a bottom view of the tongue mechanism of FIG. 6.

FIG. 6 is a partial sectioned side view of the tongue mechanism 400 of FIG. 4, shown in the first free position. FIG. 7 is a bottom view of the same tongue mechanism 400 with the cap 429 removed in the same first free position. In one embodiment, when there is less force acting on the webbing 225 than is necessary to overcome the force applied by the biasing member 440, the slider 430 remains in the first free position and the tongue mechanism 400 is free to slide along the webbing 225. The webbing 225 may pass through the slider gap 436.

In one embodiment, the slider 430 is comprised of an outer material 431 and an inner reinforcement material 432. The outer material 431 may be an easily shaped material such as plastic, while the inner reinforcement material 432 may be a rigid material that is difficult to bend such as steel. In this embodiment, the combination of an outer material 431 and an inner reinforcement material 432 allows for the manufacture of a slider 430 that meets specific shape and strength requirements.

In one embodiment, the body 420 may include a plurality of stops configured to limit the lateral travel of the slider 430. The body contact surface 425 may act as the primary rear stop. In one embodiment, the body 420 may include a secondary rear stop 427 to the rear of the body contact surface. The body 420 may also include a forward stop 428 to restrict the movement of the slider 430 in the opposite direction.

Figure 8:
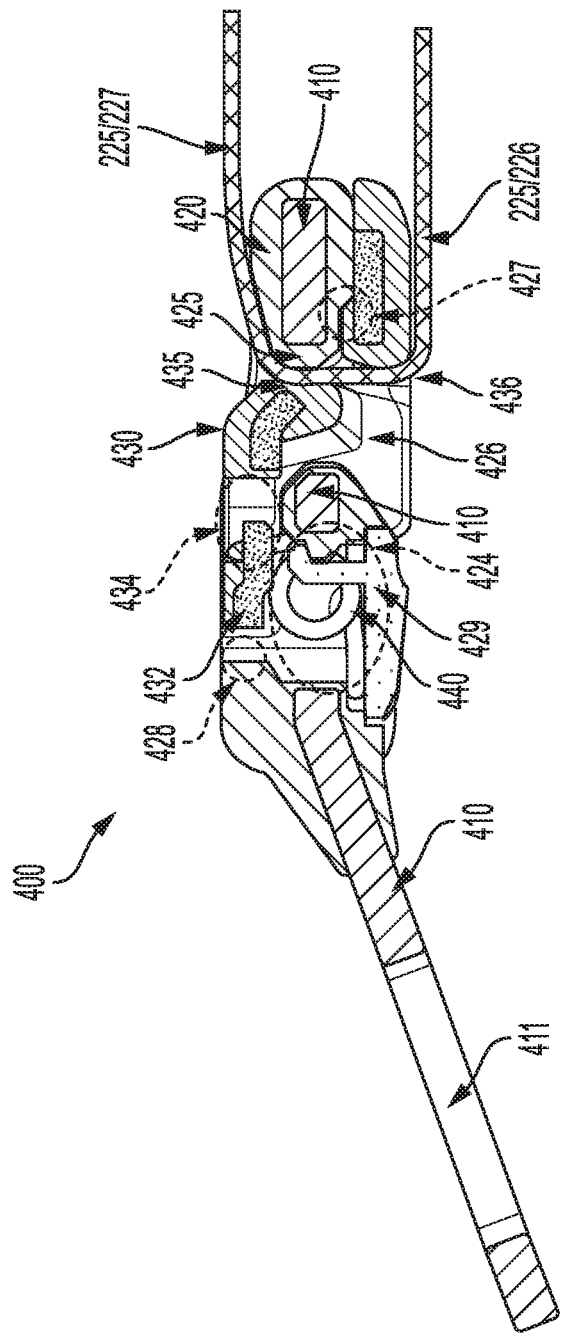
FIG. 8 is a partial sectioned side view of the tongue mechanism of FIG. 4 taken along the lines 6-6, shown in a second locked position.

FIG. 8 is a partial sectioned side view of the tongue mechanism 400 of FIG. 4, shown in the second locked position. FIG. 9 is a bottom view of the same tongue mechanism 400 with the cap 429 removed in the same second locked position. In one embodiment, when sufficient force is applied to the buckle mechanism 400 via the webbing 225 to overcome the force applied by the biasing member 440, the slider 430 moves to the second locked position and closes the gap between the body contact surface 425 and the slider contact surface 435. While the slider 430 is in the second locked position, the body contact surface 425 and the slider contact surface 435 may hold a section of the webbing 225 in place relative to themselves. In this manner, the tongue mechanism 400 ceases to move along the length of the webbing 225 while sufficient force is applied. In one embodiment, when the force applied to the webbing 225 no longer exceeds the force applied by the biasing member 440, the slider 430 returns to the first free position, the gap between the body contact surface 425 and the slider contact surface 435 opens, and the tongue mechanism 400 may move freely along the length of the webbing 225 again.

Figure 10B:
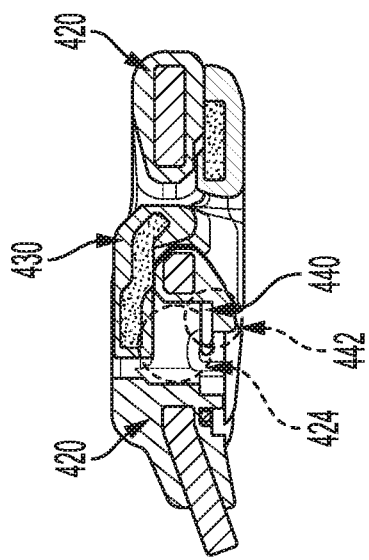
FIG. 10B is a partial sectioned side view of the tongue mechanism of FIG. 4 taken along the line 10B-10B and indicating the point of contact between one end of the biasing member and the body socket.
Figure 10C:
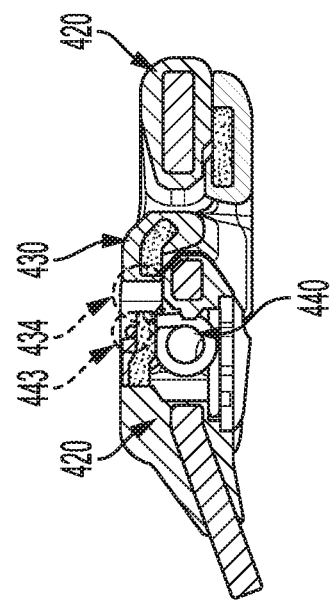
FIG. 10C is a partial sectioned side view of the tongue mechanism of FIG. 4 taken along the line 10C-10C and indicating the point of contact between the middle of the biasing member and the slider socket.
Figure 10A:
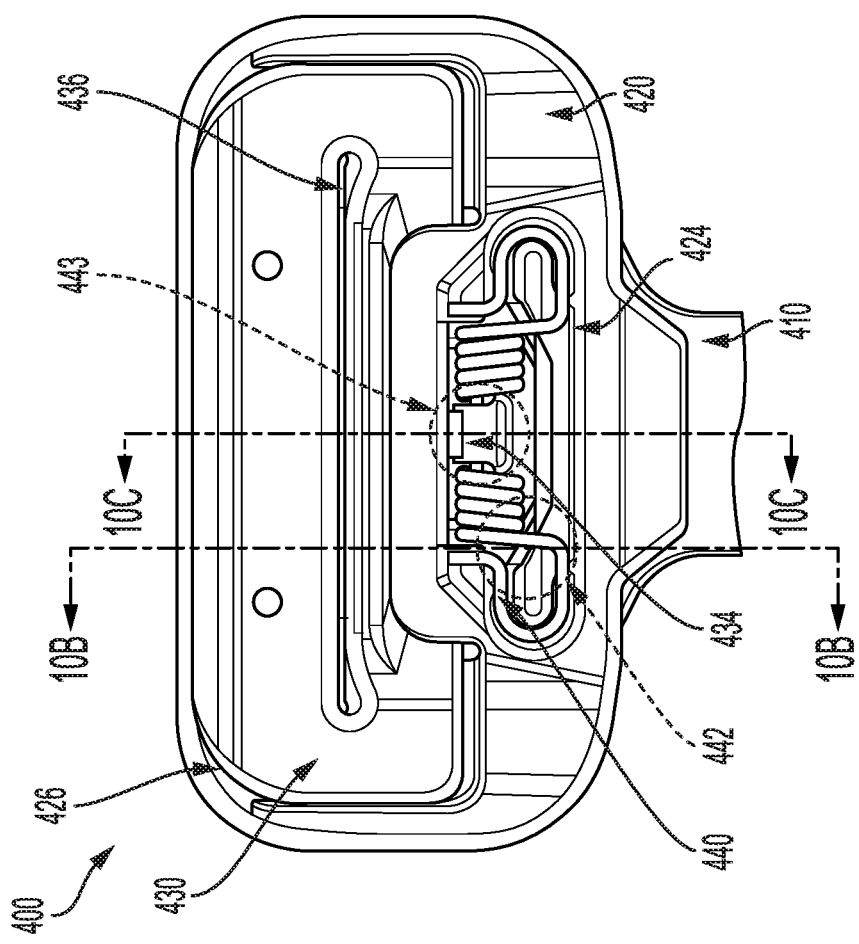
FIG. 10A is a bottom view of the tongue mechanism of FIG. 4 windicating the points of contact of the biasing member with the body socket and the slider socket.

FIG. 10A is a bottom view of the tongue mechanism 400 indicating the points of contact 442, 443 of the biasing member 440 with the body socket 424 and the slider socket 434. In one embodiment, both the body 420 and the slider 430 are designed to accommodate the biasing member 440 such that it has the leverage necessary to act upon the body 420 and the slider 430 without moving out of place. The biasing member may act upon the body 420 and the slider 430 by exerting force at the points of contact 442, 443.

FIG. 10B is a partial sectioned side view of the tongue mechanism of FIG. 4 taken along the line 10B-10B and indicating the point of contact 442 between one section of the biasing member 440 and the body socket 424. FIG. 10C is a partial sectioned side view of the tongue mechanism 400 taken along the line 10C-10C and indicating the point of contact 443 between one section of the biasing member 440 and the slider socket 434.

While this disclosure makes reference to exemplary embodiments, it will be understood by those skilled in the art that various changes in form and details may be made therein without departing from the scope of the claimed embodiments.

What is claimed is:

1. A tongue mechanism for use in an occupant restraint system of a vehicle, the occupant restraint also having a buckle mechanism and a webbing, comprising:
    a tongue member configured to selectively engage the buckle mechanism of the occupant restraint system;
    a body formed over a plate portion of the tongue member wherein the body includes
    a body contact surface, a first wall, and a second wall opposing the first wall;
    a slider provided between the first and second walls of the body and configured to slide laterally parallel to the plate portion along a track between a first free position and a second locking position, wherein the slider includes a slider contact surface; and
    a biasing member configured to laterally bias the slider;
    wherein when the slider is positioned in the first free position the tongue mechanism is free to slide along the length of the webbing of the occupant restraint system, and when the slider is positioned in the second locking position a portion of the webbing is clamped between the slider contact surface and the body contact surface thereby preventing the tongue mechanism from sliding along the length of the webbing.

2. The tongue mechanism of claim 1, wherein the biasing member is configured to laterally bias the slider towards the first free position.

3. The tongue mechanism of claim 1, wherein the biasing member is configured to laterally bias the slider towards the first free position unless the slider exerts a force on the biasing member that exceeds a predetermined threshold.

4. The tongue mechanism of claim 3, wherein the predetermined threshold is determined by the biasing member and the resistance the biasing member provides to a frictional force between the webbing and the slider contact surface resulting from the relative movement between the webbing and the tongue mechanism and the webbing sliding relative to the slider contact surface so that the predetermined threshold corresponds to sliding of the webbing at a predetermined speed threshold.

5. The tongue mechanism of claim 1, wherein the body includes a plurality of stops configured to limit the lateral travel of the slider.

6. The tongue mechanism of claim 1, wherein the body includes an opening configured to receive at least a portion of the biasing member.

7. The tongue mechanism of claim 1, wherein the slider includes an opening configured to receive at least a portion of the biasing member.

8. The tongue mechanism of claim 1, wherein the biasing member is a torsion spring.

9. The tongue mechanism of claim 1, wherein the biasing member is a double torsion spring.

10. The tongue mechanism of claim 1, wherein the slider comprises an outer material and an inner reinforcement material.

11. The tongue mechanism of claim 1, wherein when a portion of the webbing is clamped between the slider contact surface and the body contact surface, the motion of the webbing is restricted primarily for another portion of the webbing that is acting as a lap restraint for an occupant of the vehicle.

12. The tongue mechanism of claim 1, wherein the slider contact surface is an angled flat surface designed to match a corresponding angled flat surface forming the body contact surface.

13. The tongue mechanism of claim 1, wherein the slider contact surface and the body contact surface are parallel.

14. The tongue mechanism of claim 1, further comprising a stop comprising parallel surfaces of the slider and body that make contact to thereby limit travel of the slider in a locking direction.

15. An occupant restraint system configured to selectively restrain a seated occupant of a vehicle, comprising:
    a webbing having a first end connected to an anchor, and a second end;
    a buckle mechanism having an opening and a release; and
    a tongue mechanism configured to selectively slide along the length of the webbing between the first and second ends of the webbing;
    wherein the tongue mechanism includes a latch plate configured to pass through the opening of the buckle mechanism to selectively engage the buckle mechanism, thereby locking the tongue mechanism to the buckle mechanism;
    wherein upon activation of the release of the buckle mechanism the latch plate releases, thereby disengaging the tongue mechanism from the buckle mechanism;
    wherein the tongue mechanism includes a body formed over a plate portion of the latch plate wherein the body includes a body contact surface and the tongue mechanism further includes a slider configured to travel laterally parallel to the plate portion along a track to selectively clamp a portion of the webbing between the slider and the body contact surface, thereby preventing the tongue mechanism from sliding along the length of the webbing,
    wherein the tongue mechanism also includes a biasing member configured to laterally bias the slider,
    wherein the tongue plate includes an opening through which the webbing passes and a portion of the body overlies the portion of the tongue plate surrounding the opening; and
    wherein the slider includes an opening configured to receive at least a portion of the biasing member.

16. The occupant restraint system of claim 15, wherein the second end of the webbing is retractably connected to a retractor mechanism configured to pretension the webbing.

17. The occupant restraint system of claim 15, wherein the portion of the body includes an opening configured to receive at least a portion of the biasing member.

18. The occupant restraint system of claim 15, wherein when a portion of the webbing is clamped between the slider and the rest of the tongue mechanism, the motion of the webbing is restricted primarily for another portion of the webbing that is acting as a lap restraint for the seated occupant.

19. The occupant restraint system of claim 18, wherein the portion of webbing that is acting as the lap restraint for the seated occupant is the portion between the first end of the webbing connected to an anchor and the portion of the webbing that is in contact with the tongue mechanism.

20. The occupant restraint system of claim 19, wherein the biasing member is configured to laterally bias the slider unless the slider exerts a force on the biasing member that exceeds a predetermined threshold, and wherein the predetermined threshold is determined by the biasing member and the resistance the biasing member provides to a frictional force between the webbing and the slider contact surface resulting from the relative movement between the webbing and the tongue mechanism and the webbing sliding relative to the slider contact surface so that the predetermined threshold corresponds to sliding of the webbing at a predetermined speed threshold.

21. The occupant restraint system of claim 15, wherein the slider contact surface and the body contact surface are parallel.

22. The occupant restraint system of claim 15, further comprising a stop comprising parallel surfaces of the slider and body that make contact to thereby limit travel of the slider in a locking direction.

23. An occupant restraint system configured to selectively restrain a seated occupant of a vehicle, comprising:
- a webbing having a first end connected to an anchor, and a second end;
- a buckle mechanism having an opening and a release; and
- a tongue mechanism configured to selectively slide along the length of the webbing between the first and second ends of the webbing;
- wherein the tongue mechanism includes a latch plate configured to pass through the opening of the buckle mechanism to selectively engage the buckle mechanism, thereby locking the tongue mechanism to the buckle mechanism;
- wherein upon activation of the release of the buckle mechanism the latch plate releases, thereby disengaging the tongue mechanism from the buckle mechanism;
- wherein the tongue mechanism includes a body formed over a plate portion of the latch plate wherein the body includes a body contact surface and the tongue mechanism further includes a slider configured to travel laterally parallel to the plate portion along a track to selectively clamp a portion of the webbing between the slider and the body contact surface, thereby preventing the tongue mechanism from sliding along the length of the webbing,
- wherein the tongue mechanism also includes a biasing member configured to laterally bias the slider,
- wherein the tongue plate includes an opening through which the webbing passes and a portion of the body overlies the portion of the tongue plate surrounding the opening; and
- wherein the slider contact surface and the body contact surface are parallel.

* * * * *